United States Patent
Bar Zvi et al.

(10) Patent No.: US 10,586,335 B2
(45) Date of Patent: Mar. 10, 2020

(54) HAND SEGMENTATION IN A 3-DIMENSIONAL IMAGE

(71) Applicant: INTEL CORPORATION, Santa Clara, CA (US)

(72) Inventors: Asaf Bar Zvi, Yavne (IL); Kfir Viente, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 15/687,823

(22) Filed: Aug. 28, 2017

(65) Prior Publication Data

US 2019/0066300 A1    Feb. 28, 2019

(51) Int. Cl.
  *G06T 7/11* (2017.01)
  *G06K 9/00* (2006.01)
  *G06K 9/62* (2006.01)
  *G06F 3/01* (2006.01)
  *G06T 7/136* (2017.01)
  *G06T 7/143* (2017.01)

(52) U.S. Cl.
  CPC ............ *G06T 7/11* (2017.01); *G06K 9/00382* (2013.01); *G06K 9/6267* (2013.01); *G06T 7/136* (2017.01); *G06T 7/143* (2017.01); *G06F 3/017* (2013.01); *G06K 9/00355* (2013.01); *G06K 9/00375* (2013.01); *G06K 9/00389* (2013.01); *G06T 2207/20112* (2013.01); *G06T 2207/30196* (2013.01)

(58) Field of Classification Search
  CPC ............ G06K 9/00382; G06K 9/6267; G06K 9/00355; G06K 9/00389; G06K 9/00375; G06T 2207/20112; G06T 2207/30196; G06T 7/11; G06T 7/136; G06T 7/143; G06T 15/00; G06T 17/00; G06F 3/017
  See application file for complete search history.

(56) References Cited

U.S. PATENT DOCUMENTS 9,256,780 B1 *   2/2016   DeBattista ............... G06T 7/11
9,536,136 B2    1/2017   Kounavis
2012/0308140 A1 * 12/2012   Ambrus ............ G06K 9/00362
                                                                    382/190

* cited by examiner

*Primary Examiner* — Kenny A Cese
(74) *Attorney, Agent, or Firm* — Finch & Maloney PLLC (57) ABSTRACT

Techniques are provided for segmentation of a hand from a forearm in an image frame. A methodology implementing the techniques according to an embodiment includes estimating a wrist line within an image shape that includes a forearm and a hand. The wrist line estimation is based on a search for a minimum width region of the shape that is surrounded by adjacent regions of greater width on each side of the minimum width region. The method also includes determining a forearm segment, and a hand segment that is separated from the forearm segment by the wrist line. The method further includes labeling the forearm segment and the hand segment. The labeling is based on a connected component analysis of the forearm segment and the hand segment. The method further includes removing the labeled forearm segment from the image frame to generate the image segmentation of the hand.

22 Claims, 9 Drawing Sheets
(7 of 9 Drawing Sheet(s) Filed in Color)

FIG. 1

Orientation 1
202

Orientation 2
204

Orientation 3
206

FIG. 2

Hand
Segmentation
System
106

Input Image
(forearm and hand)
102

Wrist Line
Detection
Circuit
302

Hand/Forearm
Segment Labeling
Circuit
304

Hand
location
data
for next
frame
308

Forearm Segment
Removal
Circuit
306

Segmented
Hand
108

Hand/Forearm
Segment Labeling
Circuit
304

Wrist Line Coordinates
412

↓

Segment Division
Circuit
602

↓

Connected Component
Analysis Labeling Circuit
604

↓

Hand Segment
Determination Circuit
606

↓

Forearm Segment
Removal
Circuit
306

HAND SEGMENTATION IN A 3-DIMENSIONAL IMAGE

BACKGROUND

The capability for automatic identification and segmentation of a user's hand from an image is useful in a variety of computer vision applications. Existing hand segmentation systems typically perform this process based on an assumption that the palm of the hand can be identified as a globally largest circular distention in an image that includes the user's hand and forearm, and thus the palm region can be approximated with a bounded circle or ellipse. This technique is not robust, however, as different hand shapes and orientations can result in the selection of a largest circular region in some other portion of the user's forearm, causing incorrect hand segmentation which can cause downstream computer vision tasks to fail.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for segmentation of a hand from a forearm in an image frame. The term "hand," as used herein, refers to the region of the image that includes both the subject's palm and fingers (including thumb). The segmentation is based on an estimate of an optimal dividing line between the hand and the forearm, which is typically associated with the narrowest region of the wrist area in most human subjects. This dividing line, or wrist line, is in turn based on a determination of the general wrist location and the forearm orientation, as will be described in greater detail below.

The anatomical shape of the human hand (and other natural and man-made arrangements that mimic, whether intentionally or not, the anatomical shape of the human hand) ensures that the wrist line will almost always be the narrowest line between any two points on the contour of the shape that includes the forearm and the hand, provided that there is a relative widening of adjacent lines parallel to that wrist line. This feature of the wrist line will generally hold true regardless of the orientation or shape of the hand, and thus provides a reliable basis for wrist line estimation. While the description provided herein focuses on human subjects, note that techniques provided herein may be applied to non-human subjects as well, such as manikins, human-like robots or robotic arm/hand assemblies, or other subjects having a comparable forearm and hand arrangement upon which the disclosed techniques can operate, as will be appreciated. Further, note that the techniques do not necessarily require a complete hand (all five fingers). In some cases, for instance, the subject hand may be a missing a finger or have an incomplete finger (for whatever reason). In any such cases, the techniques provided herein can be applied to estimate a wrist line within an image shape that includes an object recognizable as a forearm and hand.

The disclosed techniques can be implemented, for example, in a computing system or a software product executable or otherwise controllable by such systems, although other embodiments will be apparent. The system or product is configured to perform hand segmentation in a 3-dimensional (3D) image frame, although in some embodiments the segmentation may be performed on a 2-dimensional (2D) image with potentially reduced performance advantages. In accordance with an embodiment, a methodology to implement these techniques includes estimating a wrist line within an image shape that includes a forearm and a hand. The wrist line estimation is based on a search for a minimum width region of the shape that is surrounded by adjacent regions of greater width on each side of the minimum width region. The method also includes determining a forearm segment and a hand segment that are separated by the wrist line. The method further includes tagging or otherwise labeling the forearm segment and the hand segment. In some embodiments, the labeling is based on a connected component analysis of the forearm segment and the hand segment. The method further includes removing the labeled forearm segment from the image frame to generate the image segmentation of the hand.

As will be appreciated, the techniques described herein may allow for improved hand segmentation, compared to existing methods that rely on assumptions that the palm of the hand is the largest circular shape in an image comprising the user's hand and forearm, which is not necessarily true for all hand shapes and orientations. The disclosed techniques can be implemented on a broad range of platforms including laptops, tablets, smart phones, workstations, personal assistant systems, and embedded devices. These techniques may further be implemented in hardware or software or a combination thereof.

Figure 1:
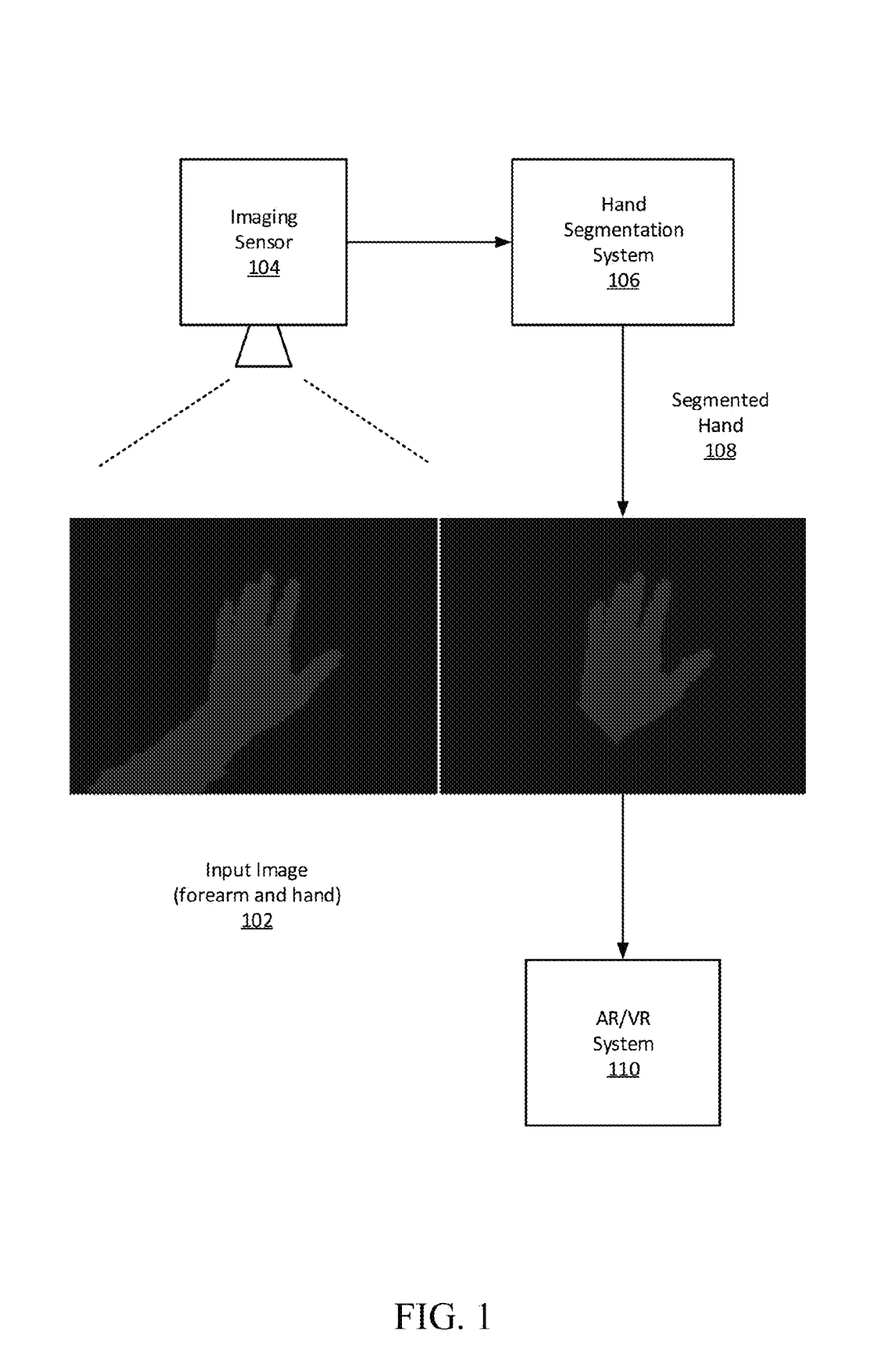
FIG. 1 is a block diagram of an implementation of a hand segmentation system, configured in accordance with certain embodiments of the present disclosure.

FIG. 1 is a block diagram 100 of an implementation of a hand segmentation system, configured in accordance with certain embodiments of the present disclosure. An imaging sensor 104 is configured to capture an input image 102 of a forearm and hand. In some embodiments, the imaging sensor may be a depth camera, infrared (IR) camera, or other suitable device configured to capture a 3-dimensional image. In some embodiments, a sequence of multiple input image frames may be captured. The image frame, or frames, are provided to a hand segmentation system 106 which is configured to generate a segmented hand 108 from the input image frame 102 based on a determination of the wrist line. The wrist line is associated with one of the narrowest regions of the forearm/hand combination shape, as will be described in greater detail below. The segmented hand 108 may then be provided to a downstream application for further processing. Examples of such applications that utilize hand segmentation include, but are not limited to, augmented reality applications, virtual reality applications, hand classification applications, hand tracking applications, hand gesture recognition applications, and hand pose recognition applications.

Figure 2:
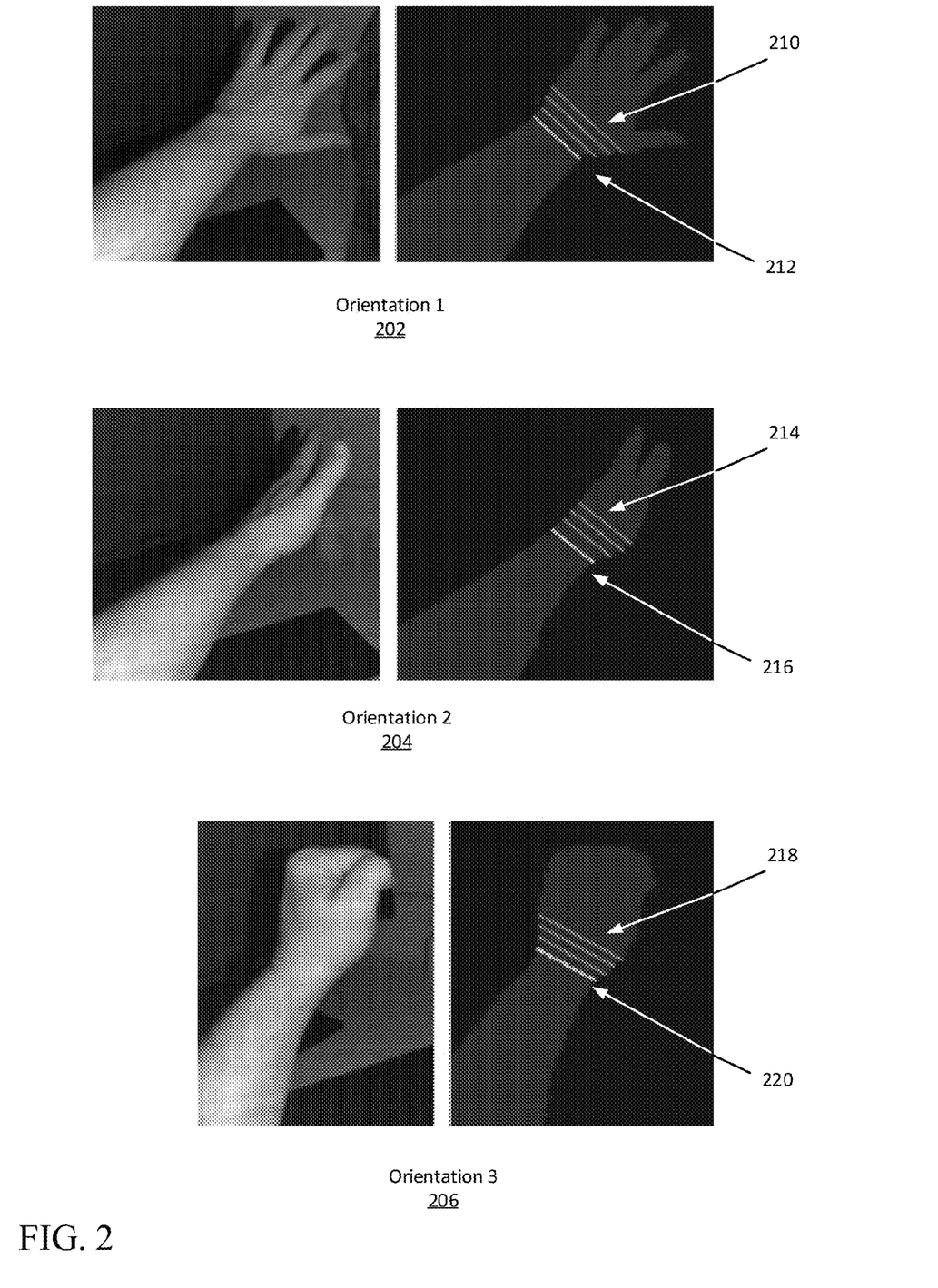
FIG. 2 illustrates wrist line decisions, in accordance with certain embodiments of the present disclosure.

FIG. 2 illustrates wrist line decisions, in accordance with certain embodiments of the present disclosure. Three different example orientations and poses of a forearm and hand are shown. The first orientation 202 is a top-down view of the forearm and hand. The second orientation 204 is a side view of the forearm and hand. The third orientation 206 is a side view of the forearm with a hand clenched in a first position. In each instance, the relatively narrowest regions, 212, 216, and 220 respectively, can be correctly associated with the wrist line, while adjacent and wider parallel lines 210, 214, and 218 can be correctly rejected as wrist line estimations.

Figure 3:
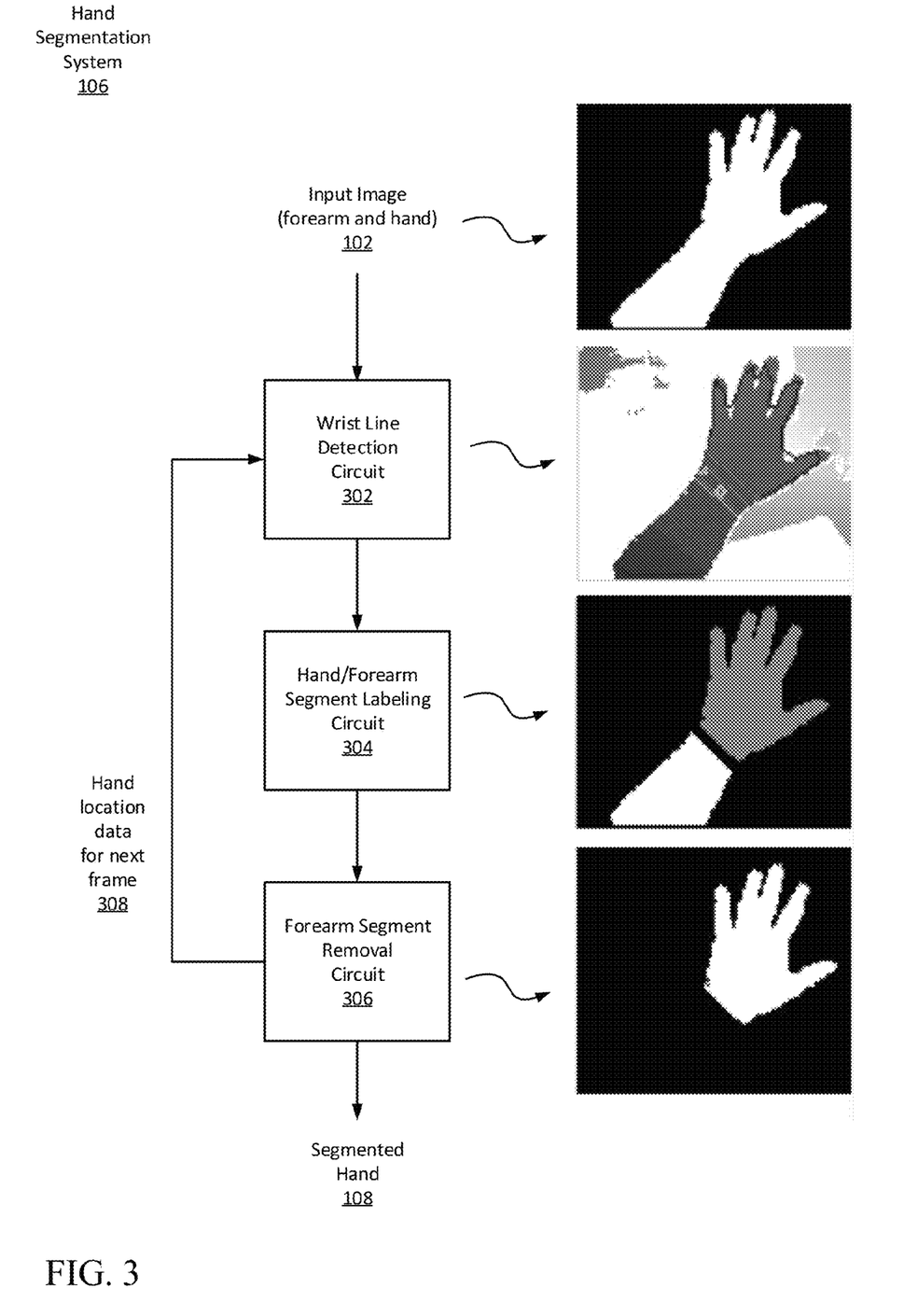
FIG. 3 is a top-level block diagram of the hand segmentation system, configured in accordance with certain embodiments of the present disclosure.

FIG. 3 is a top-level block diagram of the hand segmentation system 106, configured in accordance with certain embodiments of the present disclosure. The hand segmentation system 106 is shown to include a wrist line detection circuit 302, a hand/forearm segment labeling circuit 304, and a forearm segment removal circuit 306.

At a high level, the wrist line detection circuit 302 is configured to estimate the location of a wrist line associated with the shape in the image frame 102 that includes a forearm and a hand. The wrist line estimation is based on a search for a minimum width region of the shape that is adjacent to regions of greater width on each side of the minimum width region, as will be explained in greater detail below.

The hand/forearm segment labeling circuit 304 is configured to determine and label (or otherwise identify) the boundaries of the forearm segment and the hand segment, wherein the forearm segment is separated from the hand segment by the wrist line. In some embodiments, the labeling is based on a connected component analysis of the forearm segment and the hand segment. The forearm segment removal circuit 306 is configured to remove the labeled (or otherwise identified) forearm segment from the image frame to generate the image segmentation of the hand 108. In some embodiments, this may be accomplished by setting all pixels, other than those associated with the hand component, to a background value (e.g., zero) to generate the segmented hand image.

In some embodiments, the hand segmentation system 106 may be configured to operate on a sequence of image frames. In such cases, information associated with the location of the segmented hand 308 (and/or the estimated wrist line), from a previous frame, may be provided as prior knowledge feedback to the wrist line detection circuit to aid in processing a subsequent image frame, as will be described in greater detail below.

Figure 4:
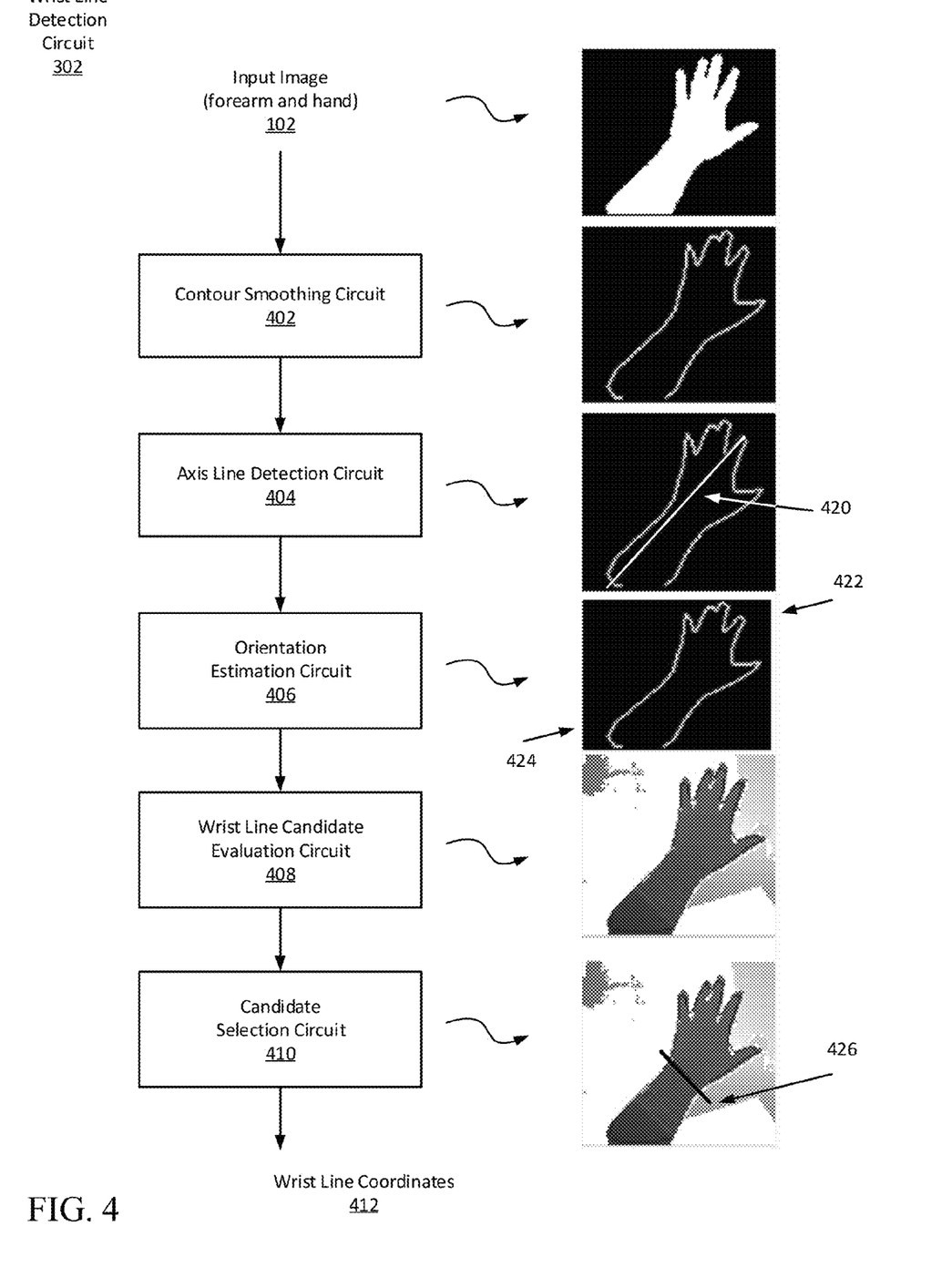
FIG. 4 is a more detailed block diagram of a wrist line detection circuit, configured in accordance with certain embodiments of the present disclosure.

FIG. 4 is a more detailed block diagram of a wrist line detection circuit 302, configured in accordance with certain embodiments of the present disclosure. The wrist line detection circuit 302 is shown to include a contour smoothing circuit 402, an axis line detection circuit 404, an orientation estimation circuit 406, a wrist line candidate evaluation circuit 408, and a candidate selection circuit 410.

The contour smoothing circuit 402 is configured to perform a smoothing operation on the shape to generate a smoothed shape which provides a number of benefits. One benefit is that the smoothing reduces noise in the captured shape edges, which can affect the credibility of the wrist line candidate width. Another benefit is that the smoothing can filter out portions of the forearm/hand shape which are outliers such as, for example, wristwatches, jewelry, sleeves, etc.

The axis line detection circuit 404 is configured to determine a major (or long) axis 420 associated with the smoothed shape, that is to say, an axis extending between the fingers and the elbow region. The determination is based on a search for a maximum Euclidean distance between points on the perimeter of the smoothed shape, because the fingers and the elbow are located at the extreme opposite ends of the shape.

The orientation estimation circuit 406 is configured to determine a first end 422 of the major axis, which is associated with fingers of the hand, and a second end 424 of the major axis, which is associated with the elbow of the forearm. The determination is based on a ranking of points at each end of the axis, based on tests related to one or more of geometric conditions, image frame boundary conditions, results from prior image frames, and/or other known techniques in light of the present disclosure.

The "geometric conditions" test includes a geometric projection of the hand/forearm from a 3D space to a 2D image plane, and the application of logical conditions necessary to match the 3D space to the 2D image plane based on assumptions related to hand-body ergonomics. For example, head mounted display (HMD) devices provide an egocentric view in which the major axis geometric point associated with the higher vertical location and greater depth location is more likely to be at the "finger" end of the axis, leaving the other side as being most likely the "elbow" end of the axis. Said differently, when the camera is located on the user's head and the view is egocentric, a human hand is unlikely to be able to reach to a position where the fingers, as they are projected on the image, are geometrically lower than the elbow and closer to the camera (i.e., at a reduced depth).

The "image frame boundary conditions" test determines the "finger" end of the major axis based on the entry location of the hand segment into the image frame boundary. For example, in the egocentric HMD view, the entry point of the hand into the frame, is unlikely to be from the upper frame boundary, thus if one of the two major axis points endpoints are on the upper edge of the frame, it may be considered to be the "finger" end of the axis.

The wrist line candidate evaluation circuit 408 is configured to evaluate a number of wrist line candidates. The candidates are generated by traversing the major axis, for example from the elbow to the fingers, and selecting candidate wrist lines that are perpendicular to the major axis. The candidates are evaluated based on one or more of the following conditions: the distance to the elbow end of the axis, the distance to the finger end of the axis, and the length of the wrist line candidate. The distances and lengths used for evaluation are based on known or pre-selected anatomical and ergonomic parameters including heuristic thresholds related to human hand sizes. The candidates are further evaluated based on a comparison of the length of the wrist line candidate to adjacent parallel wrist line candidates. The length of a preferred wrist line candidate should generally be less than the length of adjacent neighboring lines on either side.

The candidate selection circuit 410 is configured to select one of the plurality of wrist line candidates based on a ranking of the evaluations, and further based on any available wrist line estimations that were obtained from previous image frames and to which frame-to-frame motion estimation may be applied, in some embodiments. The selected wrist line 426 may be represented by coordinates 412 of the endpoints of the wrist line.

Figure 5:
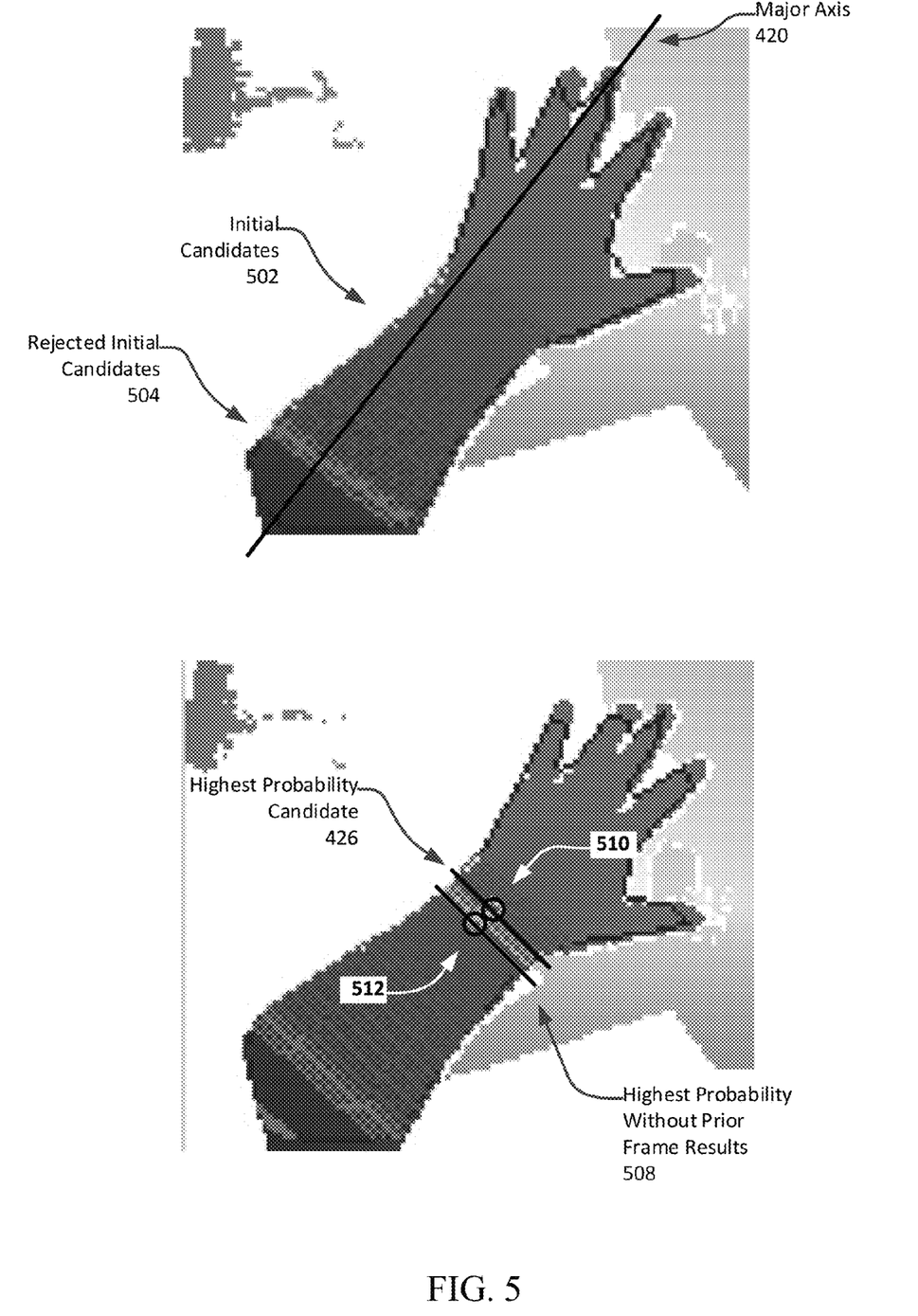
FIG. 5 illustrates wrist line candidates and selection, in accordance with certain embodiments of the present disclosure.

FIG. 5 illustrates wrist line candidates and selection, in accordance with certain embodiments of the present disclosure. A number of initial candidates 502 are shown (in red), which are selected as being perpendicular to the major axis 420. Some of these initial candidates are rejected 504 (shown in magenta) for example, based on distance from the finger end of the axis being too great and/or the length of the candidate line being too long. A first estimate of the best candidate wrist line 508 is shown based on a minimum length in comparison to adjacent candidate lines without consideration of results from previous image frames.

Circle 512 indicates the location of the estimated wrist line from the previous image frame, and circle 510 indicates where that estimated wrist line would be in the current image frame after accounting for frame-to-frame motion. An updated highest probability candidate 426 may then be generated based on the additional information provided by circle 510.

Figure 6:
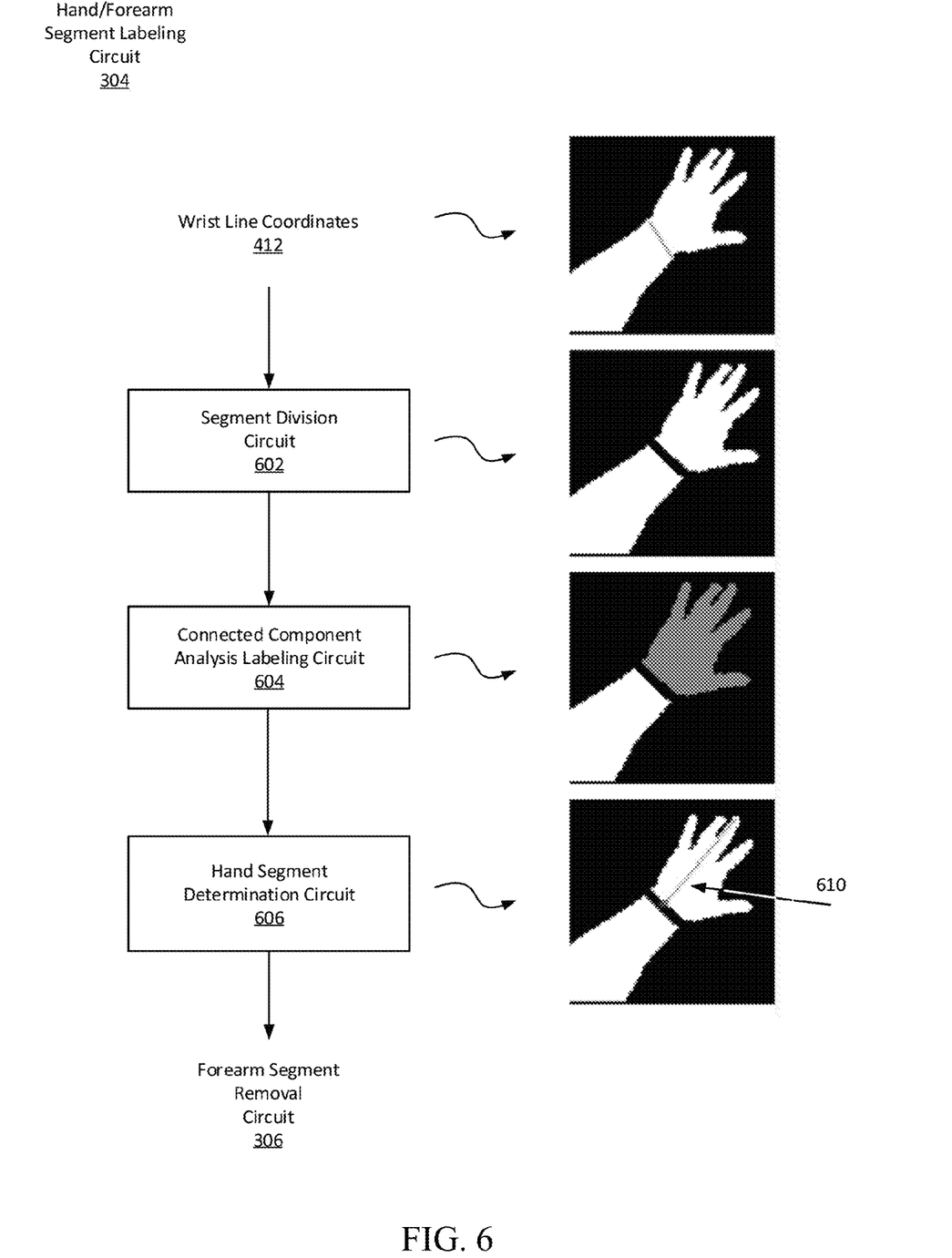
FIG. 6 is a more detailed block diagram of a hand/forearm segment labeling circuit, configured in accordance with certain embodiments of the present disclosure.

FIG. 6 is a more detailed block diagram of a hand/forearm segment labeling circuit 304, configured in accordance with certain embodiments of the present disclosure. The hand/forearm segment labeling circuit 304 is shown to include a segment division circuit 602, a connected component analysis labeling circuit 604, and a hand segment determination circuit 606.

Figure 7:
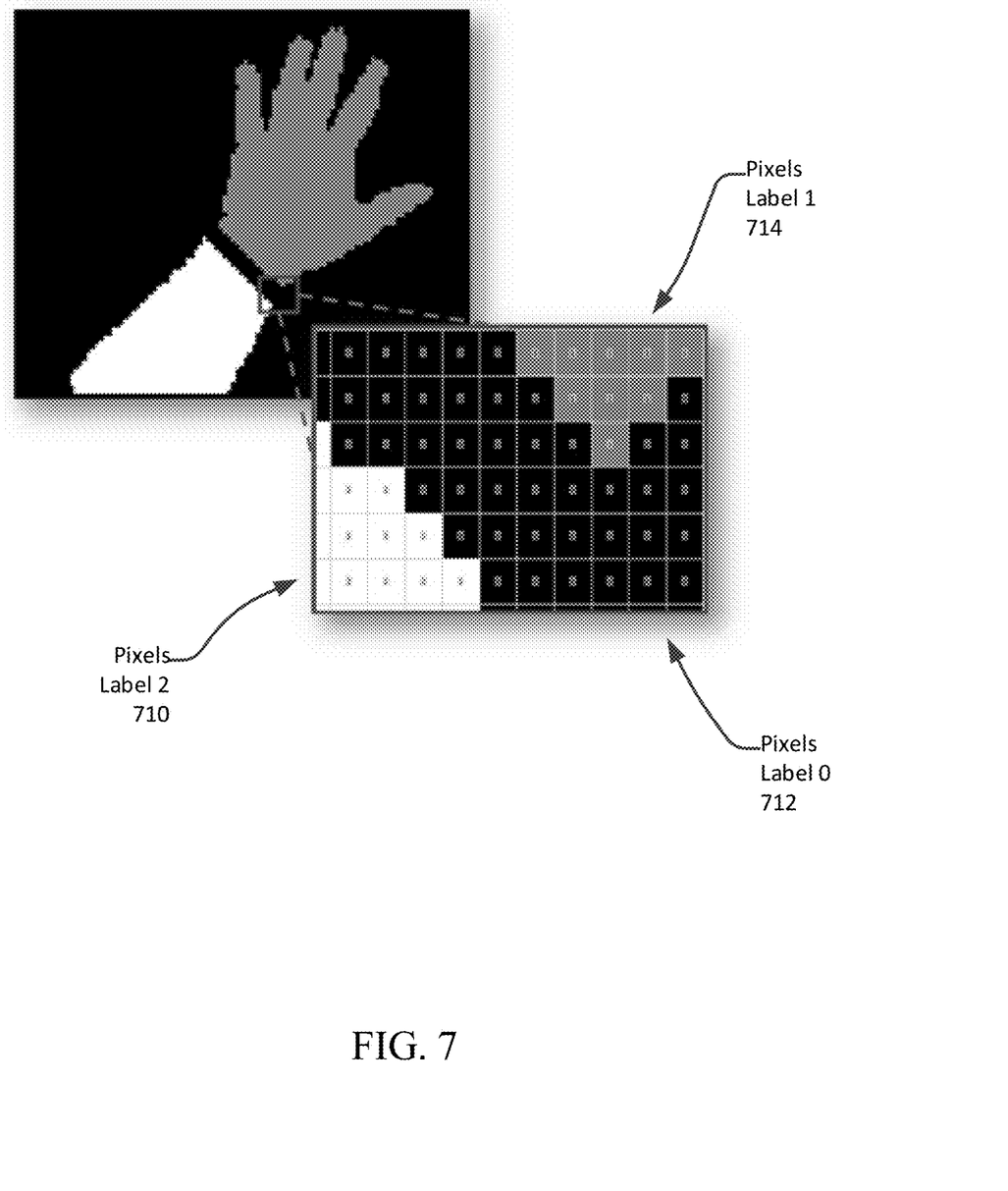
FIG. 7 illustrates pixel labeling of segments based on connected component analysis, in accordance with certain embodiments of the present disclosure.

The segment division circuit 602 is configured to divide the full input image shape 102 into two segments, hand and forearm, based on the wrist line coordinates provided by wrist line detection circuit 302. This may be accomplished, for example, by setting the pixels along the wrist line to a background value such as zero, as illustrated by reference number 712 in FIG. 7.

The connected component analysis labeling circuit 604 is configured to provide common numeric labeling to each pixel that belongs to the same component. For example, pixels that belong to the hand component may be labeled with the value one, as illustrated by reference number 714 in FIG. 7, and pixels that belong to the forearm component may be labeled with the value two, as illustrated by reference number 710 in FIG. 7. All other pixels, not belonging to either the hand component or the forearm component, will be labeled with the background value of zero.

The hand segment determination circuit 606 is configured to find the label for the hand component by searching from the middle point of the wrist line outward 610 in the direction of the previously determined finger end of the major axis. The hand segment pixel labels may then be provided to the forearm segment removal circuit 306 which may be configured to set all pixels, other than those associated with the hand component, to the background value (e.g., zero) to generate the segmented hand image 108.

Methodology

Figure 8:
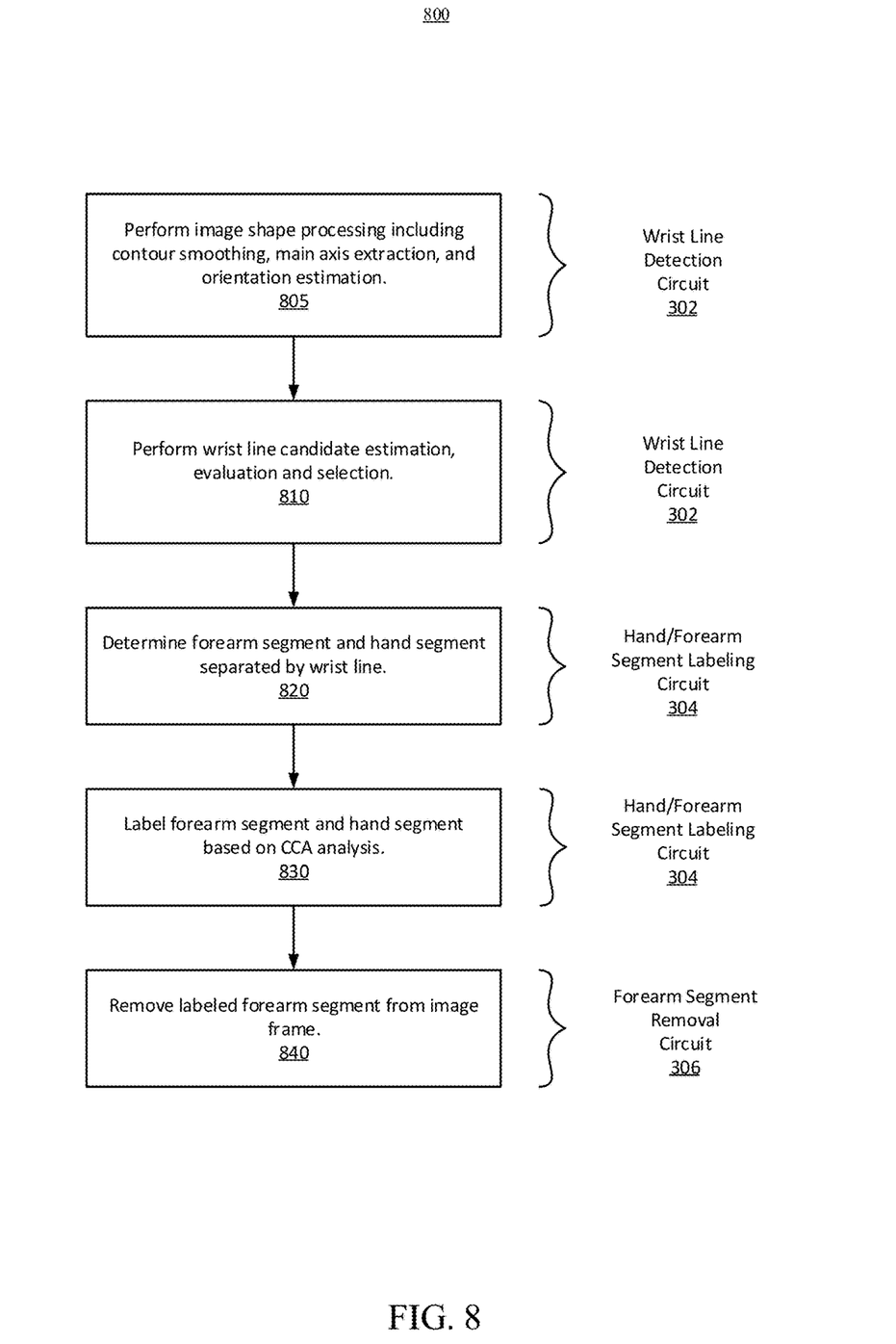
FIG. 8 is a flowchart illustrating a methodology for hand segmentation, in accordance with certain embodiments of the present disclosure.

FIG. 8 is a flowchart illustrating an example method 800 for hand segmentation in a 3-dimensional image, in accordance with certain embodiments of the present disclosure. As can be seen, the example method includes a number of phases and sub-processes, the sequence of which may vary from one embodiment to another. However, when considered in the aggregate, these phases and sub-processes form a process for a hand segmentation in accordance with certain of the embodiments disclosed herein. These embodiments can be implemented, for example using the system architecture illustrated in FIGS. 1, 3, 4, and 6, as described above. However other system architectures can be used in other embodiments, as will be apparent in light of this disclosure. To this end, the correlation of the various functions shown in FIG. 8 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 800. Thus, other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 8, in an embodiment, method 800 for hand segmentation commences by estimating, at operations 805 and 810, a wrist line associated with a shape that includes a forearm and a hand. The shape is included in an image frame. In some embodiments, the image frame may be one of a sequence of image frames, and the image frames may be provided by a depth camera or other 3-dimensional imaging sensor. At operation 805, image shape processing is performed which may include contour smoothing of the image shape, major axis determination, and orientation estimation. At operation 810, wrist line candidates are estimated evaluated and selected. The wrist line estimation is based on a search for a minimum width region of the shape that is surrounded by adjacent regions of greater width on each side of the minimum width region. In some embodiments, the search proceeds along the major axis that extends along the shape from the forearm elbow to the fingers, evaluating wrist line candidates based on length and other selected anatomical and ergonomic characteristics. In some embodiments, the candidate evaluation may also be based on information obtained from wrist line estimations of one or more previous image frames.

Next, at operation 820, a forearm segment and a hand segment are determined, within the image shape, based on separation between the hand and forearm by the wrist line. At operation 830, the forearm segment and the hand segment are labeled. In some embodiments, the labeling is based on a connected component analysis of the forearm segment and the hand segment. At operation 840, the labeled forearm segment is removed from the image frame to generate the image segmentation of the hand.

Of course, in some embodiments, additional operations may be performed, as previously described in connection with the system. For example, a contour smoothing operation may be performed on the shape to generate a smoothed shape prior to wrist line detection. In some embodiments, the resulting image segmentation of the hand may be provided to one or more of an augmented/virtual reality application, a hand classification application, a hand tracking application, and a hand gesture/pose recognition application.

Example System

Figure 9:
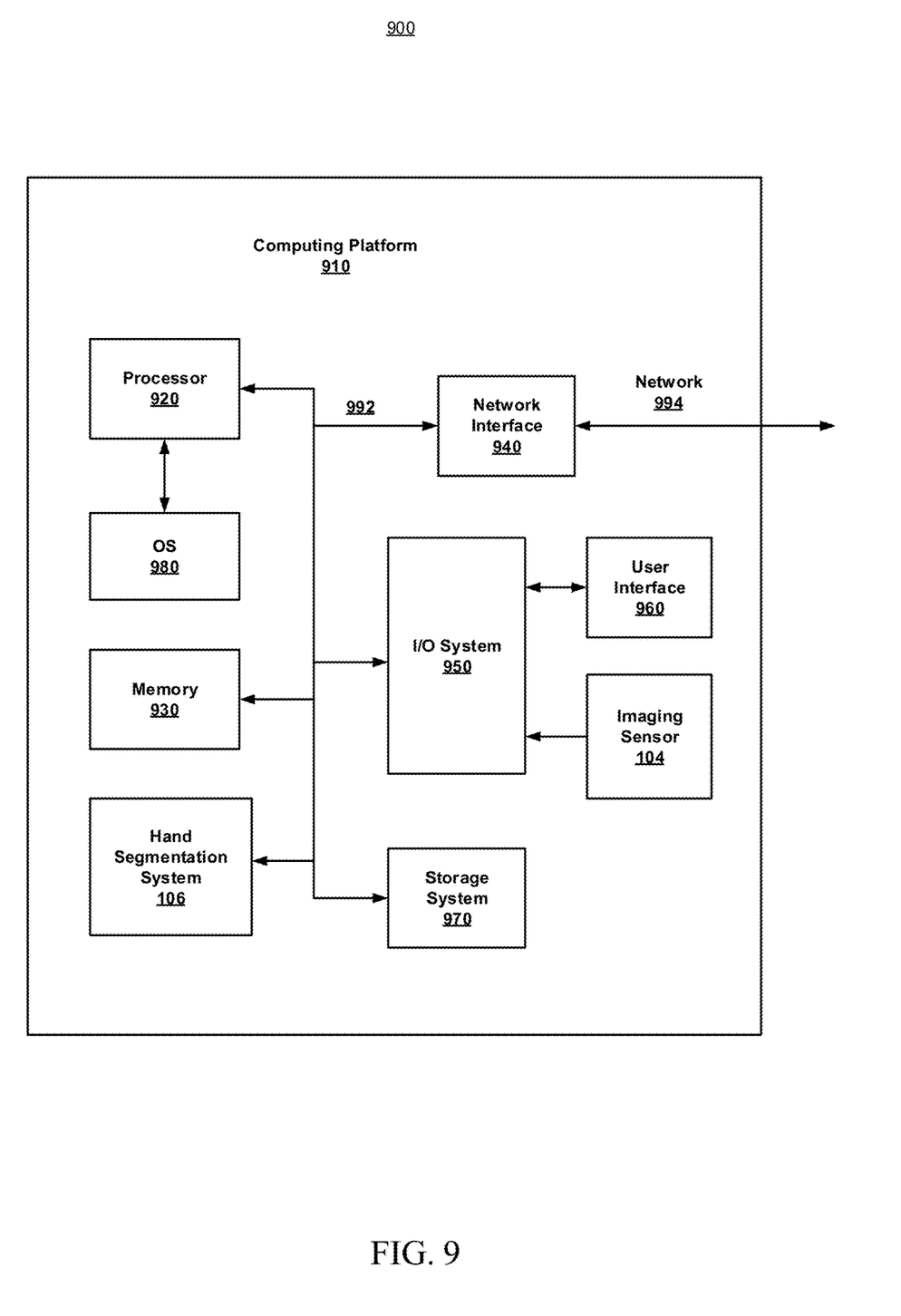
FIG. 9 is a block diagram schematically illustrating a computing platform configured to perform hand segmentation, in accordance with certain embodiments of the present disclosure.

FIG. 9 illustrates an example system 900 to perform hand segmentation of an image, configured in accordance with certain embodiments of the present disclosure. In some embodiments, system 900 comprises a computing platform 910 which may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, camera, imaging device, and so forth. Any combination of different devices may be used in certain embodiments.

In some embodiments, platform 910 may comprise any combination of a processor 920, a memory 930, hand segmentation system 106, a network interface 940, an input/output (I/O) system 950, a user interface 960, an imaging sensor 104, and a storage system 970. As can be further seen, a bus and/or interconnect 992 is also provided to allow for communication between the various components listed above and/or other components not shown. Platform 910 can be coupled to a network 994 through network interface 940 to allow for communications with other computing devices, platforms, or resources. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as a graphics processing unit, an audio processor, or hardware accelerator, to assist in control and processing operations associated with system 900. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor. In some embodiments, processor 920 may be configured as an x86 instruction set compatible processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 900, and therefore may also be implemented using any suitable existing or subsequently-developed platform.

Network interface circuit 940 can be any appropriate network chip or chipset which allows for wired and/or wireless connection between other components of computer system 900 and/or network 994, thereby enabling system 900 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of computer system 900. I/O devices may include, but not be limited to, user interface 960 and imaging sensor 104 (e.g., a depth camera or other suitable source). User interface 960 may include devices (not shown) such as a display element, touchpad, keyboard, mouse, microphone, and speaker, etc. I/O system 950 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 910.

It will be appreciated that in some embodiments, the various components of the system 900 may be combined or integrated in a system-on-a-chip (SoC) architecture. In some embodiments, the components may be hardware components, firmware components, software components or any suitable combination of hardware, firmware or software.

Hand segmentation system 106 is configured to perform segmentation of a hand in 3-dimensional image, as described previously. Hand segmentation system 106 may include any or all of the circuits/components illustrated in FIGS. 3, 4, and 6, including wrist line detection circuit, hand/forearm segment labeling circuit, and forearm segment removal circuit, as described above. These components can be implemented or otherwise used in conjunction with a variety of suitable software and/or hardware that is coupled to or that otherwise forms a part of platform 910. These components can additionally or alternatively be implemented or otherwise used in conjunction with user I/O devices that are capable of providing information to, and receiving information and commands from, a user.

In some embodiments, these circuits may be installed local to system 900, as shown in the example embodiment of FIG. 9. Alternatively, system 900 can be implemented in a client-server arrangement wherein at least some functionality associated with these circuits is provided to system 900 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 994 or remotely coupled to network 994 by one or more other networks and/or communication channels. In some cases, access to resources on a given network or computing system may require credentials such as usernames, passwords, and/or compliance with any other suitable security mechanism.

In various embodiments, system 900 may be implemented as a wireless system, a wired system, or a combination of both. When implemented as a wireless system, system 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the hand segmentation methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. In other embodiments, the functionalities disclosed herein can be incorporated into other software applications, such as, for example, augmented/virtual reality applications, hand classification applications, hand tracking applications, and hand gesture/pose recognition applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform methods and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for image segmentation of a hand. The method comprises: receiving an image frame including a shape that is representative of a forearm and a hand; estimating, by a processor-based system, a wrist line associated with the shape, the wrist line estimation identifying a minimum width region of the shape that is adjacent to regions of greater width on each side of the minimum width region; identifying, by the processor-based system, a forearm segment and a hand segment, the forearm segment separated from the hand segment by the wrist line; and removing, by the processor-based system, the identified forearm segment from the image frame, thereby providing image segmentation of the hand.

Example 2 includes the subject matter of Example 1, wherein the wrist line estimation further comprises performing a contour smoothing operation on the shape to generate a smoothed shape.

Example 3 includes the subject matter of Examples 1 or 2, wherein the wrist line estimation further comprises determining a major axis associated with the smoothed shape, the determination based on a search for a maximum Euclidean distance between points on the perimeter of the smoothed shape.

Example 4 includes the subject matter of any of Examples 1-3, wherein the wrist line estimation further comprises determining a first end of the major axis associated with one or more fingers of the hand and a second end of the major axis associated with an elbow of the forearm, the determination based on at least one of image segmentation results from a previous image frame, hand ergonomics, and image frame boundary conditions.

Example 5 includes the subject matter of any of Examples 1-4, wherein the wrist line estimation further comprises evaluating a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates.

Example 6 includes the subject matter of any of Examples 1-5, wherein the wrist line estimation further comprises selecting one of the plurality of wrist line candidates based on a ranking of the evaluations, and further based on a wrist line estimation obtained from a previous image frame.

Example 7 includes the subject matter of any of Examples 1-6, wherein the image frame is a 3-Dimensional image frame provided by a depth camera.

Example 8 includes the subject matter of any of Examples 1-7, further comprising providing the image segmentation of the hand to an application.

Example 9 includes the subject matter of any of Examples 1-8, wherein the application is one or more of an augmented reality application, a virtual reality application, a hand classification application, a hand tracking application, a hand gesture recognition application, and a hand pose recognition application.

Example 10 includes the subject matter of any of Examples 1-9, wherein identifying the forearm segment and the hand segment includes labeling the forearm segment and the hand segment, the labeling based on a connected component analysis of the forearm segment and the hand segment, and wherein removing the identified forearm segment from the image frame includes removing the labelled forearm segment from the image frame.

Example 11 is a system for image segmentation of a hand. The system comprises: a wrist line detection circuit to receive an image frame including a shape that is representative of a forearm and a hand, and to estimate a wrist line associated with the shape, the wrist line estimation identifying a minimum width region of the shape that is adjacent to regions of greater width on each side of the minimum width region; a segment labeling circuit to identify a forearm segment and a hand segment, the forearm segment separated from the hand segment by the wrist line; and a segment removal circuit to remove the identified forearm segment from the image frame, thereby providing image segmentation of the hand.

Example 12 includes the subject matter of Example 11, wherein the wrist line detection circuit further comprises a contour smoothing circuit to perform a smoothing operation on the shape to generate a smoothed shape.

Example 13 includes the subject matter of Examples 11 or 12, wherein the wrist line detection circuit further comprises an axis line detection circuit to determine a major axis associated with the smoothed shape, the determination based on a search for a maximum Euclidean distance between points on the perimeter of the smoothed shape.

Example 14 includes the subject matter of any of Examples 11-13, wherein the wrist line detection circuit further comprises an orientation estimation circuit to determine a first end of the major axis associated with one or more fingers of the hand and a second end of the major axis associated with an elbow of the forearm, the determination based on at least one of image segmentation results from a previous image frame, hand ergonomics, and image frame boundary conditions.

Example 15 includes the subject matter of any of Examples 11-14, wherein the wrist line detection circuit further comprises a wrist line candidate evaluation circuit to evaluate a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates.

Example 16 includes the subject matter of any of Examples 11-15, wherein the wrist line detection circuit further comprises a candidate selection circuit to select one of the plurality of wrist line candidates based on a ranking of the evaluations, and further based on a wrist line estimation obtained from a previous image frame.

Example 17 includes the subject matter of any of Examples 11-16, wherein the image frame is a 3-Dimensional image frame provided by a depth camera.

Example 18 includes the subject matter of any of Examples 11-17, wherein the system is further to provide the image segmentation of the hand to an application.

Example 19 includes the subject matter of any of Examples 11-18, wherein the application is one or more of an augmented reality application, a virtual reality application, a hand classification application, a hand tracking application, a hand gesture recognition application, and a hand pose recognition application.

Example 20 includes the subject matter of any of Examples 11-19, wherein identifying the forearm segment and the hand segment includes labeling the forearm segment and the hand segment, the labeling based on a connected component analysis of the forearm segment and the hand segment, and wherein removing the identified forearm segment from the image frame includes removing the labelled forearm segment from the image frame.

Example 21 is at least one non-transitory computer readable storage medium having instructions encoded thereon that, when executed by one or more processors, result in the following operations for image segmentation of a hand. The operations comprise: receiving an image frame including a shape that is representative of a forearm and a hand; estimating a wrist line associated with the shape, the wrist line estimation identifying a minimum width region of the shape that is adjacent to regions of greater width on each side of the minimum width region; identifying a forearm segment and a hand segment, the forearm segment separated from the hand segment by the wrist line; and removing the identified forearm segment from the image frame, thereby providing image segmentation of the hand.

Example 22 includes the subject matter of Example 21, wherein the wrist line estimation further comprises performing a contour smoothing operation on the shape to generate a smoothed shape.

Example 23 includes the subject matter of Examples 21 or 22, wherein the wrist line estimation further comprises the operation of determining a major axis associated with the smoothed shape, the determination based on a search for a maximum Euclidean distance between points on the perimeter of the smoothed shape.

Example 24 includes the subject matter of any of Examples 21-23, wherein the wrist line estimation further comprises the operation of determining a first end of the major axis associated with one or more fingers of the hand and a second end of the major axis associated with an elbow of the forearm, the determination based on at least one of image segmentation results from a previous image frame, hand ergonomics, and image frame boundary conditions.

Example 25 includes the subject matter of any of Examples 21-24, wherein the wrist line estimation further comprises the operation of evaluating a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates.

Example 26 includes the subject matter of any of Examples 21-25, wherein the wrist line estimation further comprises the operation of selecting one of the plurality of wrist line candidates based on a ranking of the evaluations, and further based on a wrist line estimation obtained from a previous image frame.

Example 27 includes the subject matter of any of Examples 21-26, wherein the image frame is a 3-Dimensional image frame provided by a depth camera.

Example 28 includes the subject matter of any of Examples 21-27, further comprising the operation of providing the image segmentation of the hand to an application.

Example 29 includes the subject matter of any of Examples 21-28, wherein the application is one or more of an augmented reality application, a virtual reality application, a hand classification application, a hand tracking application, a hand gesture recognition application, and a hand pose recognition application.

Example 30 includes the subject matter of any of Examples 21-29, wherein identifying the forearm segment and the hand segment includes the operation of labeling the forearm segment and the hand segment, the labeling based on a connected component analysis of the forearm segment and the hand segment, and wherein removing the identified forearm segment from the image frame includes the operation of removing the labelled forearm segment from the image frame.

Example 31 is a system for image segmentation of a hand. The system comprises: means for receiving an image frame including a shape that is representative of a forearm and a hand; means for estimating a wrist line associated with the shape, the wrist line estimation identifying a minimum width region of the shape that is adjacent to regions of greater width on each side of the minimum width region; means for identifying a forearm segment and a hand segment, the forearm segment separated from the hand segment by the wrist line; and means for removing the identified forearm segment from the image frame, thereby providing image segmentation of the hand.

Example 32 includes the subject matter of Example 31, wherein the wrist line estimation further comprises means for performing a contour smoothing operation on the shape to generate a smoothed shape.

Example 33 includes the subject matter of Examples 31 or 32, wherein the wrist line estimation further comprises means for determining a major axis associated with the smoothed shape, the determination based on a search for a maximum Euclidean distance between points on the perimeter of the smoothed shape.

Example 34 includes the subject matter of any of Examples 31-33, wherein the wrist line estimation further comprises means for determining a first end of the major axis associated with one or more fingers of the hand and a second end of the major axis associated with an elbow of the forearm, the determination based on at least one of image segmentation results from a previous image frame, hand ergonomics, and image frame boundary conditions.

Example 35 includes the subject matter of any of Examples 31-34, wherein the wrist line estimation further comprises means for evaluating a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates.

Example 36 includes the subject matter of any of Examples 31-35, wherein the wrist line estimation further comprises means for selecting one of the plurality of wrist line candidates based on a ranking of the evaluations, and further based on a wrist line estimation obtained from a previous image frame.

Example 37 includes the subject matter of any of Examples 31-36, wherein the image frame is a 3-Dimensional image frame provided by a depth camera.

Example 38 includes the subject matter of any of Examples 31-37, further comprising means for providing the image segmentation of the hand to an application.

Example 39 includes the subject matter of any of Examples 31-38, wherein the application is one or more of an augmented reality application, a virtual reality application, a hand classification application, a hand tracking application, a hand gesture recognition application, and a hand pose recognition application.

Example 40 includes the subject matter of any of Examples 31-39, wherein identifying the forearm segment and the hand segment includes means for labeling the forearm segment and the hand segment, the labeling based on a connected component analysis of the forearm segment and the hand segment, and wherein removing the identified forearm segment from the image frame includes means for removing the labelled forearm segment from the image frame.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for image segmentation of a hand, the method comprising:
receiving an image frame including a shape that is representative of a forearm and a hand, wherein the image frame is a 3-Dimensional image frame including depth information;
performing, by a processor-based system, a contour smoothing operation on the shape to generate a smoothed shape;
estimating, by the processor-based system, a wrist line associated with the smoothed shape, the wrist line estimation identifying a minimum width region between the hand and the forearm of the smoothed shape, wherein the wrist line estimation comprises determining a major axis having a first end and a second end, the first end of the major axis associated with one or more fingers of the hand and the second end of the major axis associated with an elbow end of the forearm, such that the major axis passes through the wrist line, the first end of the major axis associated with both (1) a higher vertical location in the image frame and (2) and a greater depth location in the image frame, relative to vertical and depth locations of the second end of the major axis;

identifying, by the processor-based system, a forearm segment and a hand segment in the image frame, the forearm segment and the hand segment on opposite sides of the wrist line; and removing, by the processor-based system, the identified forearm segment from the image frame, thereby providing image segmentation of the hand.

2. The method of claim 1, wherein determining the major axis includes a search for a maximum Euclidean distance between points on the perimeter of the smoothed shape.

3. The method of claim 1, wherein determining the first end of the major axis and the second end of the major axis is based on at least one of image segmentation results from a previous image frame, hand ergonomics, and image frame boundary conditions.

4. The method of claim 1, wherein the wrist line estimation further comprises evaluating a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates.

5. The method of claim 4, wherein the wrist line estimation further comprises selecting one of the plurality of wrist line candidates based on a ranking of the evaluations, and further based on a wrist line estimation obtained from a previous image frame.

6. The method of claim 1, wherein the image frame is a 3-Dimensional image frame provided by a depth camera.

7. The method of claim 1, further comprising providing the image segmentation of the hand to an application, wherein the application is one or more of an augmented reality application, a virtual reality application, a hand classification application, a hand tracking application, a hand gesture recognition application, and a hand pose recognition application.

8. The method of claim 1, wherein identifying the forearm segment and the hand segment includes labeling the forearm segment and the hand segment, the labeling based on a connected component analysis of the forearm segment and the hand segment, and wherein removing the identified forearm segment from the image frame includes removing the labelled forearm segment from the image frame.

9. A system for image segmentation of a hand, the system comprising:

a wrist line detection circuit to receive an image frame including a shape that is representative of a forearm and a hand, wherein the image frame is a 3-Dimensional image frame including depth information, perform a contour smoothing operation on the shape to generate a smoothed shape, and to estimate a wrist line associated with the smoothed shape, the wrist line estimation identifying a minimum width region between the hand and the forearm of the smoothed shape, wherein the wrist line estimation comprises determining a major axis having a first end and a second end, the first end of the major axis associated with one or more fingers of the hand and the second end of the major axis associated with an elbow end of the forearm, such that the major axis passes through the wrist line, the first end of the major axis associated with both (1) a higher vertical location in the image frame and (2) and a greater depth location in the image frame, relative to vertical and depth locations of the second end of the major axis;

a segment labeling circuit to identify a forearm segment and a hand segment in the image frame, the forearm segment and the hand segment on opposite sides of wrist line; and a segment removal circuit to remove the identified forearm segment from the image frame, thereby providing image segmentation of the hand.

10. The system of claim 9, wherein the wrist line detection circuit further comprises an axis line detection circuit to determine the major axis based on a search for a maximum Euclidean distance between points on the perimeter of the smoothed shape.

11. The system of claim 9, wherein the wrist line detection circuit further comprises an orientation estimation circuit to determine the first end of the major axis and the second end of the major axis based on at least one of image segmentation results from a previous image frame, hand ergonomics, and image frame boundary conditions.

12. The system of claim 11, wherein the wrist line detection circuit further comprises a wrist line candidate evaluation circuit to evaluate a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates.

13. The system of claim 12, wherein the wrist line detection circuit further comprises a candidate selection circuit to select one of the plurality of wrist line candidates based on a ranking of the evaluations, and further based on a wrist line estimation obtained from a previous image frame.

14. The system of claim 9, wherein the image frame is a 3-Dimensional image frame provided by a depth camera.

15. The system of claim 9, wherein identifying the forearm segment and the hand segment includes labeling the forearm segment and the hand segment, the labeling based on a connected component analysis of the forearm segment and the hand segment, and wherein removing the identified forearm segment from the image frame includes removing the labelled forearm segment from the image frame.

16. At least one non-transitory computer readable storage medium having instructions encoded thereon that, when executed by one or more processors, result in the following operations for image segmentation of a hand, the operations comprising:

receiving an image frame including a shape that is representative of a forearm and a hand, wherein the image frame is a 3-Dimensional image frame including depth information;

performing a contour smoothing operation on the shape to generate a smoothed shape;

estimating a wrist line associated with the smoothed shape, the wrist line estimation identifying a minimum width region between the hand and the forearm of the smoothed shape, wherein the wrist line estimation comprises determining a major axis having a first end and a second end, the first end of the major axis associated with one or more fingers of the hand and the second end of the major axis associated with an elbow end of the forearm, such that the major axis passes through the wrist line, the first end of the major axis associated with both (1) a higher vertical location in the image frame and (2) and a greater depth location in the image frame, relative to vertical and depth locations of the second end of the major axis;

identifying a forearm segment and a hand segment in the image frame, the forearm segment and the hand segment on opposite sides of the wrist line; and removing the identified forearm segment from the image frame, thereby providing image segmentation of the hand.

17. The non-transitory computer readable storage medium of claim 16, determining the major axis includes a search for a maximum Euclidean distance between points on the perimeter of the smoothed shape.

18. The non-transitory computer readable storage medium of claim 16, determining the first end of the major axis and the second end of the major axis is based on at least one of image segmentation results from a previous image frame, hand ergonomics, and image frame boundary conditions.

19. The non-transitory computer readable storage medium of claim 18, wherein the wrist line estimation further comprises the operation of evaluating a plurality of wrist line candidates, each wrist line candidate perpendicular to the major axis, the evaluation based on at least one of a distance from the wrist line candidate to the first end, a distance from the wrist line candidate to the second end, a length of the wrist line candidate, and a comparison of the length of the wrist line candidate to adjacent parallel wrist line candidates; and the wrist line estimation further comprises the operation of selecting one of the plurality of wrist line candidates based on a ranking of the evaluations, and further based on a wrist line estimation obtained from a previous image frame.

20. The non-transitory computer readable storage medium of claim 16, wherein the image frame is a 3-Dimensional image frame provided by a depth camera.

21. The non-transitory computer readable storage medium of claim 16, further comprising the operation of providing the image segmentation of the hand to an application, wherein the application is one or more of an augmented reality application, a virtual reality application, a hand classification application, a hand tracking application, a hand gesture recognition application, and a hand pose recognition application.

22. The non-transitory computer readable storage medium of claim 16, wherein identifying the forearm segment and the hand segment includes the operation of labeling the forearm segment and the hand segment, the labeling based on a connected component analysis of the forearm segment and the hand segment, and wherein removing the identified forearm segment from the image frame includes the operation of removing the labelled forearm segment from the image frame.

* * * * *